Patented Apr. 16, 1935

1,997,857

UNITED STATES PATENT OFFICE 1,997,857

MOISTUREPROOF MATERIAL

William Hale Charch, Buffalo, N. Y., assignor to Du Pont Cellophane Company, Inc., New York, N. Y., a corporation of Delaware No Drawing. Application May 2, 1932, Serial No. 608,849

1 Claim. (Cl. 91—68)

This invention relates to materials suitable for use as wrapping tissues and capable of resisting the diffusion of moisture or water-vapor therethrough to a substantial degree for a substantial period of time. Specifically, it relates to a sheet or film of a cellulose derivative, such as cellulose acetate, combined as by coating with a composition which imparts to the product the desirable characteristic of moistureproofness without destroying or impairing the transparency and flexibility thereof.

It is the desire of manufacturers and vendors that numerous materials including foodstuffs, drugs, candies, tobacco products, etc. reach the consumer in their original fresh state. This result may be achieved by wrapping the products in moistureproof tissues which effectively prevent the diffusion or passage of water-vapor or moisture therethrough to a substantial degree for a substantial period of time. To make an attractive package and expose the contents, the wrapper may be made of a transparent material.

Sheets or films of regenerated cellulose coated with a composition comprising a cellulose derivative and a wax, with or without a resin, and optionally a softener, have been used for the purposes aforementioned. It has been found, however, that when very moist or wet materials, such as butter, cheese and the like, are packaged therein, the moistureproof coating becomes detached or loosened from the base with the consequence that the effectiveness, i. e. moistureproofness, of the package is seriously impaired. This defect has been corrected by anchoring the moistureproof coating more securely to the regenerated cellulose base through the medium of a carefully selected coating interposed between the base and surface coating.

I have found that I can provide a moistureproof material in which the moistureproof coating is securely and permanently anchored to the base, even when in contact with very moist or wet materials, by combining a sheet or film of a cellulose derivative, particularly an organic derivative of cellulose, specifically cellulose acetate film, directly with a moistureproofing composition comprising a cellulose derivative and a wax with or without a gum or resin, and optionally a plasticizer.

It is therefore an object of this invention to provide a moistureproof, flexible and transparent material suitable for use as a wrapping tissue and comprising a sheet or film of a cellulose derivative, such as an organic derivative of cellulose, specifically cellulose acetate film, having a moistureproof coating securely and permanently anchored thereto, which coating does not loosen or detach itself from the base even when in contact with very moist or wet materials.

Another object of this invention is to provide a coated cellulose acetate film which is integral, permanent, non-separable and unitary as well as moistureproof.

A specific object of this invention is to provide a moistureproof, flexible and transparent material comprising a sheet or film of cellulose acetate combined as by being coated with a composition comprising a cellulose derivative and a wax, with or without a gum or resin, and optionally a plasticizer, the coating being permanently secured to the base so that it does not detach itself even when the material is used with very moist or wet materials.

Other objects will become apparent from the following description and appended claims:

As is apparent from the foregoing objects, the instant invention in one of its phases resides in a new type of material, namely, a moistureproof cellulose acetate film which is an integral, permanent, non-separable and unitary sheet possessing a very high degree of moistureproofness. While it has been known in the prior art to coat cellulose acetate sheeting with various types of lacquer, as in the manufacture of photographic film bases, it should be noted that none of these lacquers rendered the final product moistureproof.

In order to produce the product constituting one part of this invention, a coating composition containing a wax in combination with cellulose derivative bases, with or without the admixture of other materials, such as resins, plasticizers, etc., is used. The use of the wax leads to special problems in the process which are not encountered in the prior art coating processes, paramount among which is the necessity for subjecting the coated film to a temperature approximately, at least, equal to the melting point of the wax in the composition in order to gain transparency and moistureproofness. This is a necessary limitation of the process which in turn has led to other limiting factors, such as the use of a specific type of solvent, more fully explained hereafter.

As previously mentioned, due to the wax containing lacquer, it becomes necessary to evaporate the solvents of the coating composition at a temperature at least equal to the melting or crystallization point of the wax in the composition. This operation is accomplished in a chamber which may be heated as high as 65° C. to 95° C. At these temperatures the usual lacquer solvents, such as ethyl acetate, alcohol, etc., tend to attack and soften the film base being coated, particularly if the film or coating contains a plasticizer. Furthermore, in many of the coating processes the film under treatment is maintained under considerable tension during the coating operation and during and including the drying operation, which drying operation in the instant invention of necessity must take place in a heated chamber. This accentuates the softening of the film. Finally, in the manufacture of very thin, moistureproof and transparent cellulose acetate sheets, the effects of this heat and tension and the effects of the coating composition in combination with the heat and tension are greatly exaggerated over what they would be at lower temperatures, so that in the instant case an entirely different set of conditions is encountered than those presented in the prior art procedures.

According to this invention, a sheet or film of a cellulose derivative, more particularly an organic cellulose derivative, such as cellulose acetate of the chloroform-soluble variety or preferably the acetone-soluble variety, is combined with a composition comprising a cellulose derivative and a wax or wax-like substance, with or without a gum or resin, and optionally a plasticizer, hereafter more fully described. The cellulose acetate film is of sufficient thinness to be useful as a wrapping tissue. It is transparent and flexible and may be softened by such plasticizers as triacetin, triphenyl phosphate, tricresyl phosphate, ethyl paratoluene sulfamid, etc. The film is coated on one or both sides with the composition in any suitable manner, such as by spreading, immersion, spraying and the like. After the composition has been applied and the excess thereof removed, the solvent or solvent mixture thereof is evaporated, preferably at a temperature which is at least equal to the melting point of the wax in the composition. If desired, after the drying operation the coated material may be subjected to a humidifying treatment at an elevated temperature. In the preferred embodiment of the process, the coating and drying operations are carried out while the film is under tension.

The coating composition comprises broadly a cellulose derivative lacquer containing waxes, for instance paraffin wax or wax-like bodies, for instance synthetic wax-like substances. As to its film-forming constituents, it may consist only of a cellulose derivative and a wax or wax-like substance, or it may additionally contain a resin and/or a plasticizer.

A cellulose derivative either dissimilar chemically and/or dissimilar in its solubility properties with respect to the cellulose derivative of the base may be employed in the composition. At present I prefer a cellulose ester, such as a nitrocellulose of the pyroxylin type, or a cellulose ether, such as ethyl or benzyl cellulose.

The gum or resin which may be employed in the composition may be of either the hard or soft variety. Gum dammar, ester gum, gum mastic, copal resins or synthetic resins may be mentioned as illustrative examples. These gums may be used either singly or in combination with one another. The term "resin" employed herein and in the claims is intended to cover gums and resins, both natural and synthetic.

For the wax, I prefer to use a high melting paraffin. It is, of course, understood that various other waxes or wax-like compounds, either hard or soft, and including palm wax, ceresin wax and the like or combinations thereof, may be used.

The plasticizer which may be employed may be any of the compounds or mixtures having high boiling points and which are known as plasticizers or softeners for cellulose derivatives. I prefer to use a plasticizer which shall be substantially odorless, and I have obtained successful results with tricresyl phosphate, triphenyl phosphate, diamyl phthalate and dibutyl phthalate.

The above ingredients, when compounded in the proper proportions with suitable solvents, upon the evaporation of the solvents as described, deposit a coating which tenaciously anchors to the acetate film or the like and results in an integral, permanent and non-separable sheet which not only effectively resists the passage or penetration of moisture or water-vapor therethrough to a substantial degree for a substantial period of time but is also flexible without cracking, transparent, devoid of greasiness or tackiness and has the required tensile strength for which it is desired to be used.

Various proportions of the above ingredients may be used. I have found that satisfactory results may be obtained when the ingredients are used in the following percentages by weight:

|  | Per cent |
|---|---|
| Cellulose derivative | 30–80 |
| Gum | 0–40 |
| Wax | 1–25 |
| Plasticizer | 0–30 |

The preferred compositions contain a cellulose derivative and a wax, preferably also a gum, and optionally a plasticizer dissolved in a solvent more fully explained hereafter. When a plasticizer is employed, the content thereof is low, i. e. usually under 10% or 15% of the total solids.

The solvent or solvent mixture employed is of such a nature that it retains the film-forming ingredients, i. e. the gum, wax, cellulose derivative and plasticizer, in their proper proportions in complete solution until the entire solvent or solvent mixture is evaporated. I distinctly prefer to use solvents which have either no appreciable or only a very slight swelling action on the underlying sheet being coated. For instance, in the coating of cellulose acetate sheets with a moistureproofing pyroxylin lacquer containing wax, it is preferable to use pyroxylin solvents which do not readily attack, dissolve or swell the cellulose acetate sheet. A mixture of butyl acetate and a diluent, such as toluene with only a small quantity of an alcohol, for instance, the lower alcohols, such as methyl, ethyl or propyl (or better, no alcohols) can be used. Amyl, hexyl or heptyl acetates or mixtures of these higher boiling acetates may be employed to good advantage. Other pyroxylin solvents which may be used are ethyl butyrate, ethylene - glycol - mono - butyl-ether, butyl proprionate and butyl lactate. These solvents may be used singly or mixed.

Particularly useful for the coating of cellulose acetate sheets are lacquers comprising a base of ethyl or benzyl cellulose or other ether derivatives of cellulose. These derivatives in combination with waxes, gums, etc. are formulated into coating dopes with the use, almost exclusively, of hydrocarbon solvents, such as toluene, benzene, xylene, with or without diluents, such as gasoline fractions and the like. Such solvents have very little effect in swelling or softening the cellulose acetate, and hence these dopes may be applied from many of the already known pieces of coating apparatus without gelling, wrinkling or otherwise damaging the sheet being coated.

The following specific examples have given satisfactory results when coated on sheets or films formed of the cellulose acetate of the chloroform-soluble variety:

EXAMPLE 1

*Film-forming ingredients*

| | Parts by weight |
|---|---|
| Nitrocellulose | 52.0 |
| Ester gum | 35.0 |
| Dibutyl phthalate | 8.7 |
| Paraffin | 4.3 |

*Solvents*

| | |
|---|---|
| Alcohol | 25 |
| Ether | 43 |
| Toluene | 18 |
| Butyl acetate | 14 |

The final coating solution comprises 5%–20% of the film-forming ingredients.

EXAMPLE 2

*Film-forming ingredients*

| | Parts by weight |
|---|---|
| Nitrocellulose | 50 |
| Gum dammar | 34 |
| Tricresyl phosphate | 12 |
| Paraffin | 4 |

*Solvents*

| | |
|---|---|
| Ethyl acetate | 62 |
| Toluene | 27 |
| Alcohol | 9 |
| Butyl acetate | 2 |

The final solution contains 5%–20% of the film-forming ingredients.

The following specific examples have given satisfactory results when coated on to sheets or films of cellulose ethers or cellulose ether esters.

EXAMPLE 3

| | Parts by weight |
|---|---|
| Ethyl cellulose | 100 |
| Paraffin (m. p. 60° C.) | 2–25 |
| Toluene (or benzene) | 500 |
| Alcohol | 50 |

The ethyl cellulose is preferably one that is soluble in benzene or a benzene-alcohol mixture. Other solvents or diluents may be used as desired.

EXAMPLE 4

| | Parts by weight |
|---|---|
| Ethyl cellulose | 20 |
| Dibutyl phthalate | 1 |
| Paraffin (m. p. 60° C.) | 1 |
| Low flash naphtha (or toluene) | 200 |

The following specific examples have given satisfactory results when coated on to cellulose acetate sheets or films formed of acetone-soluble acetate, sheets or films formed of chloroform-soluble acetate as well as sheets or films formed of cellulose ethers or cellulose ether esters.

EXAMPLE 5

| | Parts by weight | |
|---|---|---|
| Nitrocellulose | 65 | |
| Tricresyl phosphate | 33 | |
| Paraffin (m. p. 62° C.) | 2 | |
| Amyl acetate | per cent 54 | |
| Toluene | do 44 | 900 |
| Alcohol | do 2 | |

EXAMPLE 6

| | Parts by weight | |
|---|---|---|
| Nitrocellulose | 56.0 | |
| Gum dammar | 34.6 | |
| Paraffin (m. p. 60° C.) | 9.4 | |
| Amyl acetate | per cent 53.4 | |
| Toluene | do 43.5 | 900.0 |
| Alcohol | do 3.1 | |

The following specific example is particularly suitable for coating a cellulose acetate film or sheet formed of the chloroform-soluble variety:

EXAMPLE 7

| | Parts by weight |
|---|---|
| Cellulose acetate (low viscosity) | 9.0 |
| Monoethylindibenzoyl benzoate | 3.0 |
| Diethylene glycol monomethyl ether phthalate | 3.0 |
| Palm wax | 1.0 |
| Ethyl-lactate—5 parts | |
| Ethylene glycol monomethyl ether—10 parts | |
| Acetone—35 parts | 88.5 |
| Toluene—20 parts | |
| Alcohol—10 parts | |
| Ethyl acetate—8.5 parts | |

If desired, the moistureproofing composition may include a coloring agent whereby the coating may be colored.

The composition above described may be applied to the base to form a coating of any desired thickness on either one or both surfaces of the base. The thickness of the coating depends upon the use to which the product is to be put and in practice coatings varying from 0.00002 to 0.0005 of an inch have given satisfactory results.

Cellulose acetate treated or processed as above described is perfectly transparent, flexible, nongreasy and non-tacky. The product, when tested in accordance with the test set forth in the Journal of Industrial and Engineering Chemistry, page 575, volume 21, No. 6, (June, 1929), is at least 7 times as effective in resisting the passage of moisture or water-vapor therethrough as the untreated film and at least 12 times as effective as plain sheets or films of regenerated cellulose. In many instances, the effectiveness of the product is 10, 15, 20, 40 or even 100 times as effective as the untreated sheet.

The product of this invention is further characterized by its relatively small swelling and shrinkage. As a consequence, moistureproofed cellulose acetate does not wrinkle or otherwise distort with wide variations in temperature and atmospheric humidity and lends itself to numerous uses where such conditions exist as, for instance, in window envelopes, window boxes and similar places where it is securely attached to another material.

Though the product of this invention is a coated sheet or film, nevertheless, due to the permanent bonding of the coating to the base, it is for all intents and purposes an integral, unitary and non-separable sheet or film, the components of which do not loosen or detach when brought in contact with high moisture or indeed with water even at an elevated temperature for weeks or longer. Because of this, the product of this invention is admirably suitable for use as a wrapping tissue for wrapping very moist or indeed wet materials. Likewise, it is indeed most suitable for wrapping of divers materials which are to be exported to tropical countries, where the humidity is abnormally high.

In addition to the previously described characteristics, those embodiments of the invention which utilize a cellulose ether as the cellulose derivative in the moistureproofing composition are truly heat-sealable, that is, when the products having coatings of a thickness previously described are heat-sealed, joints are produced which are stronger than those secured when solvent-sealed with acetone. This heat-sealing property is determined by the following test:

Strips of the coated material 1.5 inches wide are superposed on one end, so that the opposite faces of the film are in contact. A seal is made across the width of the material by imposing thereon a heated iron weighing 1,500 grams per 2 seconds. The iron is so designed as to cause a seal to be made of a width of $\frac{3}{32}$ of an inch, the iron being maintained in any suitable manner at a temperature above 130° C. and below 200° C. as, for instance, 150° C. Two strips so sealed are opened at the free end and placed in a stretching device, such as a Suter testing machine, by gripping each end of the sheet in suitable clamps, one of which is fixed and the other of which is moved away at a constant speed of 12" per minute. The force in grams required to pull the sheets apart is taken as a measure of the strength of the bond and is referred to herein as "heat-sealing value".

Though the invention has been described in particular reference to films formed of cellulose acetate of either the chloroform-soluble and preferably the acetone-soluble variety, it is to be understood that the invention is not restricted thereto. The principles thereof are equally applicable to coating divers cellulose derivatives, such as cellulose propionate, cellulose formate, ethyl cellulose, benzyl cellulose, ethyl cellulose acetate, cellulose aceto propionate and the like, upon the selection of suitable solvents in accordance with this invention.

Though the invention has been described in connection with sheets or films, it is obvious that various other articles fabricated from the cellulose derivatives herein mentioned may be moistureproofed.

By the term "moistureproof" or its equivalent employed in the claims is meant the ability of the coated sheets or films to resist the diffusion or penetration of moisture or water-vapor therethrough to a substantial degree for a substantial period of time and/or which resistance is at least approximately 7 times, and preferably 10, 15, 20, 40 or even 100 times, or more, as effective as that possessed by the uncoated sheets or films when tested in accordance with the test set forth in the Journal of Industrial and Engineering Chemistry, supra.

This application is a continuation-in-part of application Serial No. 451,194, filed May 9, 1930.

Since it is obvious that various modifications may be made in the specific details above described, the invention is not restricted thereto except as defined in the appended claim.

I claim:

A wrapping tissue comprising a unitary, integral and non-separable material consisting of a sheet or film of a cellulose derivative selected from the group which consists of cellulose acetate, cellulose propionate, cellulose formate, ethyl cellulose, benzyl cellulose, ethyl cellulose acetate and cellulose ocetyl propionate coated on both sides thereof with a moistureproofing composition comprising 30%–80% of a cellulose derivative, 0%–40% of a gum, 1%–25% of a wax and 0%–30% of a plasticizer, the total thickness of the coatings being from 0.00002 to 0.0005 of an inch, said article being transparent, flexible and non-tacky.

WILLIAM HALE CHARCH.